United States Patent
Warrier et al.

(10) Patent No.: US 7,344,793 B2
(45) Date of Patent: Mar. 18, 2008

(54) REINFORCEMENT STRUCTURES FOR ELECTROLYTE-SUPPORTED SOLID OXIDE FUEL CELL

(75) Inventors: Sunil G. Warrier, Middletown, CT (US); Jai-woh Kim, East Hartford, CT (US); Raymond Benn, Madison, CT (US); Shihong Song, South Windsor, CT (US); Venkata Vedula, Middletown, CT (US); Richard Bailey, Somers, CT (US)

(73) Assignee: UTC Power Corporation, South Windsor, CT (US)

( * ) Notice: Subject to any disclaimer, the term of this patent is extended or adjusted under 35 U.S.C. 154(b) by 337 days.

(21) Appl. No.: 10/790,577

(22) Filed: Mar. 1, 2004

(65) Prior Publication Data

US 2005/0191536 A1    Sep. 1, 2005

(51) Int. Cl.
*H01M 2/00* (2006.01)
*H01M 8/10* (2006.01)
*H01M 4/00* (2006.01)

(52) U.S. Cl. ............................. 429/34; 429/30; 429/44
(58) Field of Classification Search .................. 429/30, 429/32–34
See application file for complete search history.

(56) References Cited

U.S. PATENT DOCUMENTS

| | | | | |
|---|---|---|---|---|
| 5,856,035 A | * | 1/1999 | Khandkar et al. | ............. 429/32 |
| 6,224,993 B1 | * | 5/2001 | Hartvigsen et al. | ........... 429/30 |
| 2004/0028975 A1 | * | 2/2004 | Badding et al. | .............. 429/32 |

* cited by examiner

*Primary Examiner*—Dah-Wei Yuan
*Assistant Examiner*—Karie O'Neill
(74) *Attorney, Agent, or Firm*—Bachman & LaPointe, P.C.

(57) ABSTRACT

An electrode assembly for solid oxide fuel cells includes an electrolyte member defining a cathode side and an anode side and having an active area and an edge portion; cathode disposed on the cathode side; an anode disposed on the anode side; and at least one electrolyte support member positioned adjacent to the edge portion of the electrolyte and having an opening positioned over at least a portion of the active area.

20 Claims, 3 Drawing Sheets

REINFORCEMENT STRUCTURES FOR ELECTROLYTE-SUPPORTED SOLID OXIDE FUEL CELL

BACKGROUND OF THE INVENTION

The invention relates to fuel cells and, more particularly, to electrolyte-supported solid oxide fuel cells.

Direct conversion of chemical energy into electric energy, through use of fuel cells, is an important area of energy conversion technology. Among various types of fuel cells, the solid oxide fuel cell (SOFC) is of particular interest because operation of such fuel cells at high temperature allows direct use of natural gas as a fuel.

Fuel cells, including solid oxide fuel cells, have an electrolyte positioned between an anode and a cathode, and such a structure generates electric energy from fuel and oxidant as desired. In an electrolyte-supported SOFC, the electrolyte is the structure providing the mechanical integrity to the cell and the electrodes are held together structurally by the electrolyte.

The layers of a solid oxide fuel cell, that is, the electrolyte, anode and cathode, are typically quite thin. Thin electrolyte-supported cells, however, are subject to cracking during handling, assembly and operation because they have poor mechanical strength. While very thin electrolyte-supported cells (thickness <50 μm) may exhibit some amount of overall flexibility, local constraints (as with seals or ends) or during assembly and handling procedures can cause electrolyte fracture due to the poor strain tolerance of the ceramic electrolyte.

In addition, in an electrolyte-supported cell, electrodes are disposed and supported on the electrolyte, and these electrodes are also subject to cracking during operation.

Still further, strip-cell configuration involves positioning of via holes through the electrolyte so that communication can be established between adjacent elements of the assembly. These via holes can also experience cracking during operation.

Although these problems might dictate the use of a thicker electrolyte, this approach causes problems since the electrolyte thickness should be as small as possible in order to avoid high resistance to ion migration during electrochemical operation. The other option to decrease the resistance to ion migration is increasing the operating temperature which becomes impractical with metallic interconnects and current collectors.

Based upon the foregoing, it is clear that the need remains for improved electrolyte-supported solid oxide fuel cell structures.

It is therefore the primary object of the present invention to provide such structures.

Other objects and advantages of the present invention will appear hereinbelow.

SUMMARY OF THE INVENTION

In accordance with the present invention, the foregoing objects and advantages have been readily attained.

According to the invention, an electrode assembly for solid oxide fuel cells is provided which comprises an electrolyte member defining a cathode side and an anode side and having an active area and an edge portion; a cathode disposed on said cathode side; an anode disposed on said anode side; and at least one electrolyte support member positioned adjacent to said edge portion of said electrolyte and having an opening positioned over at least a portion of said active area.

The support member can advantageously be a frame on the edge portion of electrolyte material or other thermal expansion matched materials which can be laminated or bonded to the electrolyte.

In addition, ribs can advantageously be positioned extending between the outer frame portion of the support member, along via lines on the electrolyte, to further support the electrolyte without affecting the active area of same. These ribs can also be provided of electrolyte material or other thermal expansion matched materials, or can be either laminated, bonded or otherwise secured relative to the electrolyte as desired.

In accordance with a further aspect of the present invention, the ribs of the support member can be provided as a grid, which extends between the side edges of the frame of the support member, also along non-active portions of the electrolyte. In such cases, the coverage of the active area is optimized to provide adequate support with minimal loss in active area.

In accordance with a further aspect of the invention, the electrolyte member can advantageously be provided as a plurality of discrete electrolyte segments, and the frame can be positioned to define a plurality of openings wherein each electrolyte segment is positioned within a respective opening.

The electrode assembly in accordance with the present invention advantageously strengthens the electrolyte and associated structures so as to substantially reduce the risk of damage during handling and to increase resistance to damage during operation.

BRIEF DESCRIPTION OF THE DRAWINGS

A detailed description of preferred embodiments of the present invention follows, with reference to the attached drawings, wherein.

DETAILED DESCRIPTION

The invention relates to solid oxide fuel cells and, more particularly, to reinforcing structures for solid oxide fuel cells which enhance the strength and resistance of the electrolyte and electrolyte-supported electrodes to damage during handling, operation and the like.

In accordance with the present invention, it has been found that reinforcement structures can be positioned on non-active portions of the electrolyte or with minimal loss of active area, so as to provide the electrolyte with enhanced resistance to damage while nevertheless maintaining efficiency of operation of the electrolyte at relatively low temperatures.

Figure 1:
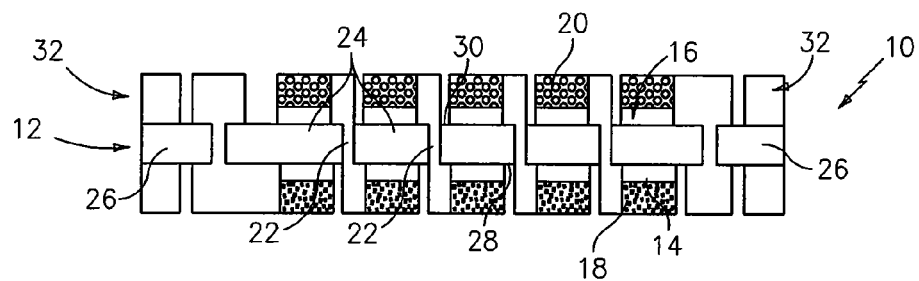
FIG. 1 is a cross section taken through an electrode assembly in accordance with the present invention.

FIG. 1 illustrates an electrode assembly 10 in accordance with the present invention having an electrolyte 12, an anode 14, a cathode 16, an anode current collector 18, a cathode current collector 20 and via lines or connections 22 extending through electrolyte 12 between anodes and cathodes on opposite sides of electrolyte 12.

Figure 2:
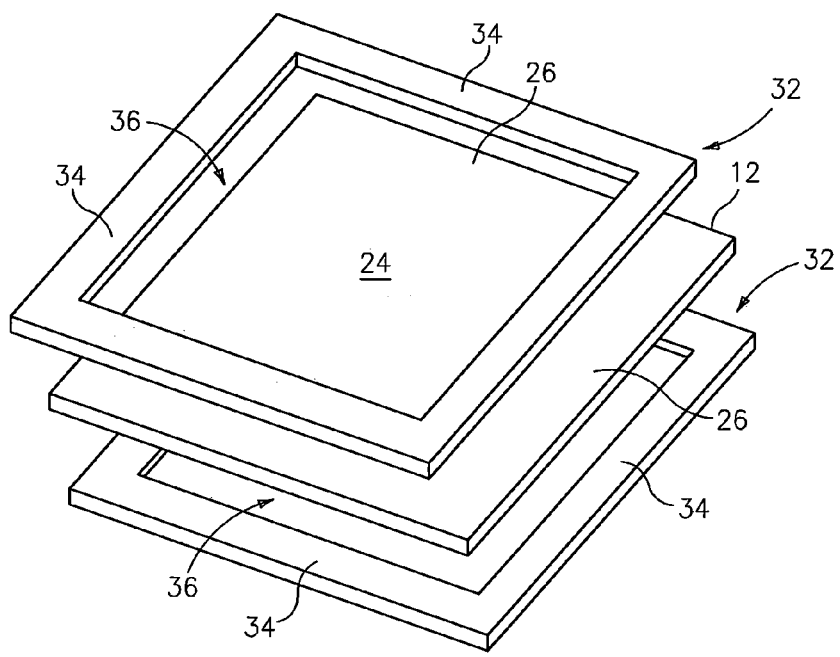
FIG. 2 is an exploded perspective view of an electrolyte member with support member in accordance with the present invention.

Referring also to FIG. 2, electrolyte 12 is a substantially thin planar member having a central active area 24 and an edge portion 26. Electrolyte 12 has two substantially flat and opposed surfaces, one defining an anode side 28 and the other defining a cathode side 30. In accordance with the present invention, a support member 32 is provided for reinforcing the edge portion 26 of electrolyte 12, thereby enhancing resistance of electrolyte 12 during handling and the like. Support member 32 serves to enhances the mechanical strength of the edges without sacrificing performance of the electrolyte which can occur if the active area of the electrolyte is substantially interfered with. Further, increased thickness of the edge of the electrolyte gives a flatter surface after sintering, which helps avoid crossover leakage through the edge during subsequent operation of same.

Electrolyte 12 can be provided of any material suitable for use as an electrolyte in a solid oxide fuel cell, which materials are well known to a person of ordinary skill in the art. In accordance with the present invention, it is preferred that electrolyte 12 be maintained as thin as possible, preferably having a thickness of less than about 150 microns, more preferably less than about 50 microns, and ideally about 20 microns. An electrolyte having such thicknesses can be operated at temperatures which are relatively low, for example less than about 800° C., without sacrificing efficiency due to increased resistance of the electrolyte.

Support member 32 in this embodiment is provided as an outside edge or frame defined by side members 34 which define an opening 36 through which active area 24 of electrolyte 12 is exposed. Support member 32 can advantageously be provided having a thickness of less than about 10 mm, preferably less than about 5 mm, and ideally about 1 mm, and such thickness advantageously serves to increase strength of edge portion 26 of electrolyte 12 as desired.

Support member 32 can advantageously be provided of electrolyte material, and may be laminated or otherwise secured to electrolyte 12 as desired. Thus, support member 32 can advantageously be provided of the same or at least similar material to electrolyte 12.

Alternatively, and as further discussed below, support member 32 can be provided from a different material and bonded or otherwise secured to electrolyte 12, so long as the material is preferably selected to have substantially similar coefficient of thermal expansion (CTE) as electrolyte 12. Other materials for this embodiment of the present invention include ferritic stainless steels, barium titanates, chromium-based alloys as well as combinations of metals and ceramics that produce similar CTE as the electrolyte.

Figure 3:
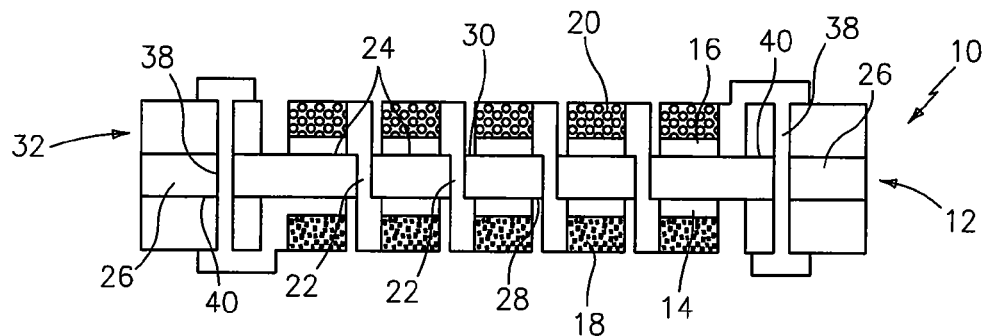
FIG. 3 is a cross section taken through another embodiment of an electrode assembly in accordance with the present invention.
Figure 4:
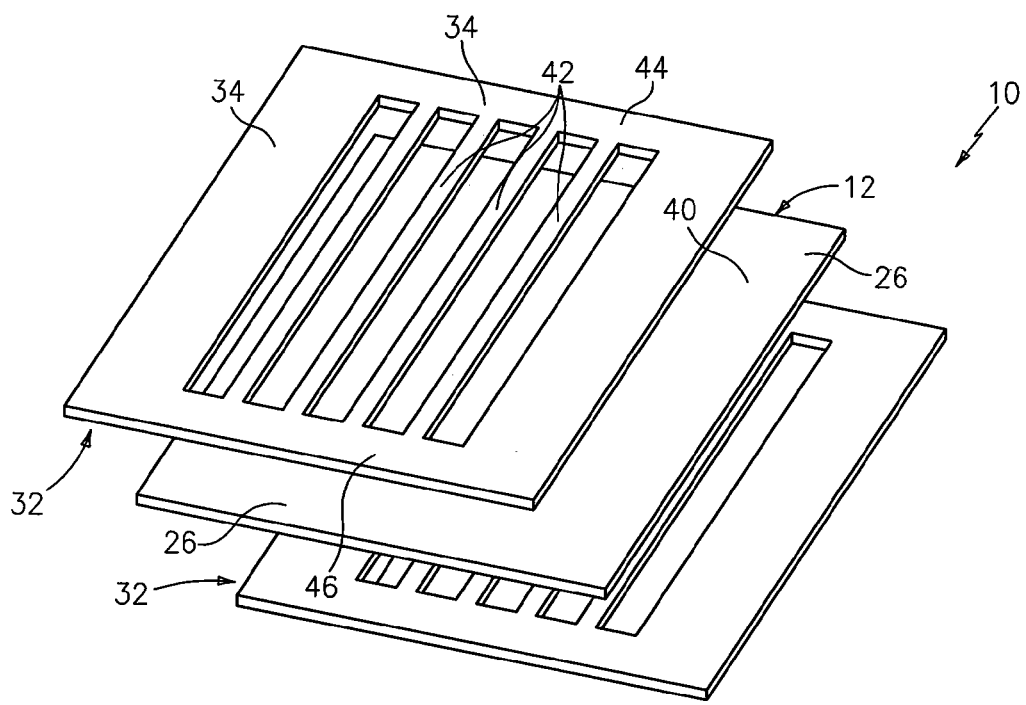
FIG. 4 is an exploded view of an electrolyte member with support members in accordance with a further embodiment of the present invention.

In accordance with a further aspect of the present invention, and referring to FIGS. 3 and 4, in some instances a power take-off foil is used to connect with the bus bar, and there may be thermal stresses between the foil and bus bar during cooling which can cause cracking of the electrolyte. FIG. 3 schematically illustrates bus bars 38 defining a bus bar zone 40 on electrolyte 12. In accordance with this aspect of the present invention, support member 32 is advantageously provided so as to extend into bus bar zone 40 so as to provide additional structural strength of these areas of the electrolyte. Further, this embodiment of the present invention does not adversely impact ionic conductivity of the electrolyte, because the active area of the electrolyte is still not interfered with, and remains substantially the same.

Another problem which exists when utilizing relatively thin electrolytes in solid oxide fuel cells is that operation of the fuel cell at the desired parameter can generate a relatively large pressure difference across the electrolyte. Although the side reinforcement aspect of support member 32 as described above can enhance resistance of the electrolyte to edge cracking and the like, it may be desirable to provide further reinforcement to electrolyte 12.

As set forth above, electrolyte 12 typically has via lines 22 which serve to provide for proper functioning of a strip cell configuration as is well known to a person of ordinary skill in the art. These via lines are not a part of the active area of the electrolyte, and can be reinforced without reducing the active area of the cell. Thus, in accordance with the embodiment of the present invention as illustrated in FIG. 4, a plurality of ribs 42 can advantageously be positioned on support member 32 for extending along via lines 22 so as to reinforce the central portion of electrolyte 12 while still maintaining openings for exposing active area 24 as desired. As shown in FIG. 4, ribs 42 can advantageously be a plurality of substantially parallel members extending between opposite side edges 44, 46 as shown. Ribs 42 are preferably provided of the same material as the rest of support member 32, and can therefore be provided as electrolyte material in accordance with one aspect of the present invention, or as a CTE matched material in accordance with a further aspect of the present invention, or can be provided of any other material as well, within the board scope of the present invention. If it is desirable, the material that reinforces the via lines can also be insulating or have insulating coatings to prevent electrical shorting from one cell to another in the strip cell configuration.

Ribs 42 add more stiffness to the electrolyte, further improving durability and handleability, and such configuration does not reduce cell active area because ribs 42 are positioned on via lines. In addition, reinforcing via lines decreases permeability of the vias and also increase integrity of the vias themselves.

It should be appreciated that support member 32 as illustrated in the drawings of the present application is shown being positioned on both sides of electrolyte 12. It may be desirable to utilize a single support member 32, positioned only on one side of electrolyte 12, and such a configuration falls completely within the broad scope of the present invention.

Figure 5:
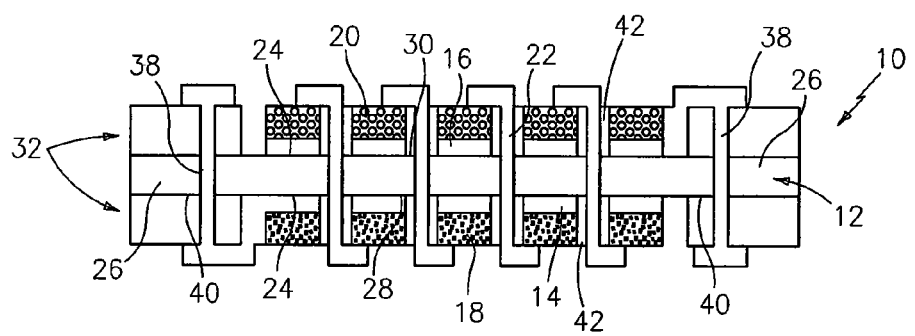
FIG. 5 is a cross section taken through an electrode assembly in accordance with a still further embodiment of the present invention.

FIG. 5 is a cross section illustrating the embodiment described above, wherein ribs 42 are positioned along via lines 22 so as to further reinforce electrolyte 12 as desired. This figure also shows the extension of support member 32 into bus bar zone 40 to reinforce this area as well.

Figure 6:
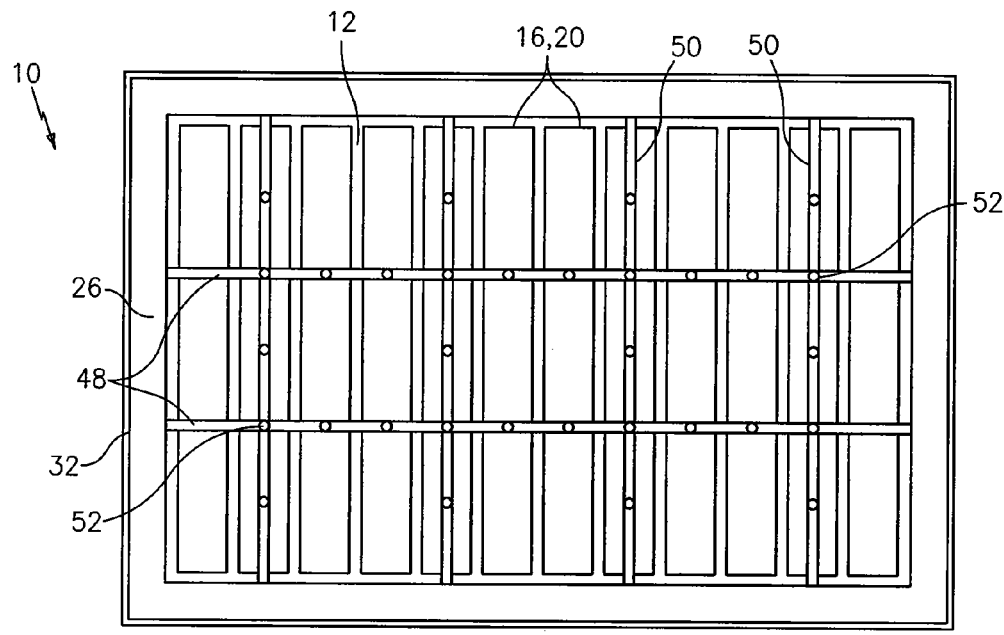
FIG. 6 is a top view of an electrode assembly in accordance with the present invention having a support grid.

In accordance with a still further aspect of the present invention, support for a central portion of electrolyte 12 can be provided as a grid member such as is illustrated in FIG. 6, wherein the grid is defined by a first plurality of ribs 48 arranged extending in one direction between opposed side members 34 of support 32, and a second group of ribs 50 which extend between different side members 34 of support member 32 in a different direction so as to define points 52 of intersection between ribs 48 and ribs 50. This serves to further reinforce electrolyte 12, enhancing rigidity of the electrolyte and resistance to damage during handling and use. In this embodiment, the grid can be laminated or bonded locally to electrolyte 12 as desired, or can be bonded locally to current collectors 18 and 20 at points of intersection 52 or along the length of the ribs either periodically or continuously. Bonding in one embodiment is advantageously at points 52 of intersection but can be in other locations as well.

The grid members may provide reinforcement on one side or both sides of the cell and may be made of CTE matched materials preferably having insulating properties, or coated with insulating materials. The grid can be advantageously provided with grid openings from 0.01 mm to 50 mm and grid thicknesses from 0.001 mm to 5 mm.

The grids may be made of materials such as wire weaves or mesh with symmetric or non-symmetric openings or of foams with random openings.

One preferred example is the use of ferritic stainless steels with alumina forming compositions or alumina coated ferritic stainless steel as a material to make the wire weave or foams. Another preferred material is zirconia foam.

In these examples a small amount of active surface area is lost for significant durability improvements.

Figure 7:
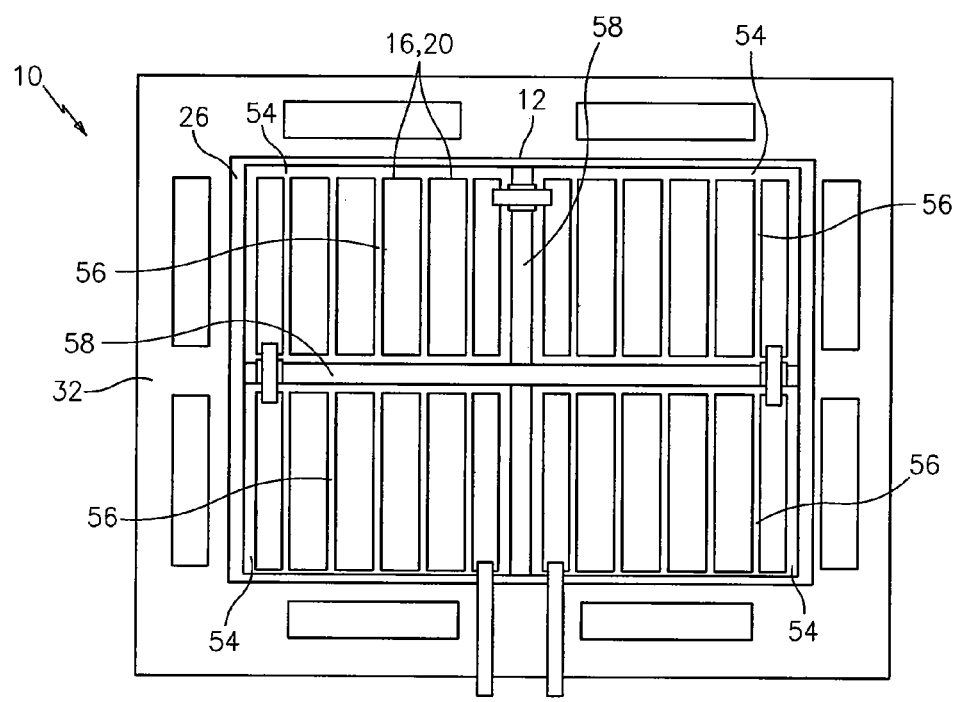
FIG. 7 is a top view of an electrode assembly in accordance with the present invention having a support grid and a plurality of electrolyte elements.

FIG. 7 illustrates a further aspect of the present invention wherein electrolyte 12 is provided as a plurality of electrolyte elements 54 which are arranged in a substantially planar configuration. Support member 32 in this aspect of the present invention is provided defining four different openings 56 for electrolyte elements 54, with ribs 58 positioned along each electrolyte element 54 as desired. This configuration advantageously allows for a plurality of electrolyte elements 54 to be utilized, which further reduces the possibility of cracking or damage during handling and use. In this regard, the support member 32 of this embodiment of the present invention defines a plurality of openings through which the plurality of electrolyte elements 54 are exposed as desired.

It should readily be appreciated that the present invention has provided reinforcement structures for electrolytes of thin electrolyte-supported solid oxide fuel cell assemblies, and these reinforcement structures greatly reduce the possibility of damage or cracking of edges, via lines and the like during handling and use of the electrode assembly. The present invention is well suited for use with reinforcement members provided of substantially the same material as the electrolyte, or alternatively in connection with use of reinforcement members provided from a substantially CTE-matched materials. Further, the invention is particularly well suited to materials which can be laminated to the electrolyte, or bonded to the electrolyte, or formed into the electrolyte, or which can be provided using other methods.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An electrode assembly for solid oxide fuel cells, comprising:
    an electrolyte member defining a cathode side and an anode side and having an active area and an edge portion;
    a cathode disposed on said cathode side;
    an anode disposed on said anode side; and
    at least one electrolyte support member positioned adjacent to said edge portion of said electrolyte and having an opening positioned over said active area, wherein said electrolyte further includes via lines for communicating said anode and said cathode through said electrolyte, wherein said at least one electrolyte support member includes ribs extending along said via lines, wherein said at least one electrolyte support member has side members extending along said edge portion, and wherein said ribs are provided as a grid extending between said side members, wherein said grid is defined by a first group of ribs extending between said side members in a first direction and a second group of ribs extending between said side members in a second direction whereby said first group of ribs and said second group of ribs define points of intersection.

2. The assembly of claim 1, wherein said at least one electrolyte support member comprises a cathode side electrolyte support member positioned adjacent to said cathode side of said electrolyte and an anode side electrolyte support member positioned adjacent to said anode side of said electrolyte.

3. The assembly of claim 1, wherein said at least one electrolyte support member comprises an electrolyte material.

4. The assembly of claim 1, wherein said at least one electrolyte support member is a material having substantially the same CTE as said electrolyte.

5. The assembly of claim 1, wherein said at least one electrolyte support member is laminated to said electrolyte.

6. The assembly of claim 1, wherein said at least one electrolyte support member is bonded to said electrolyte.

7. The assembly of claim 1, wherein said electrolyte has a thickness of less than or equal to about 50 μm.

8. The assembly of claim 1, wherein said electrolyte has a thickness of less than or equal to about 20 μm.

9. The assembly of claim 1, wherein said assembly further comprises bus bars disposed on said electrolyte defining a bus bar zone, and wherein said at least one electrolyte support member extends over said bus bar zone.

10. The assembly of claim 1, wherein said grid is bonded to said cathode side at said points of intersection.

11. The assembly of claim 1, wherein said grid is bonded to said anode side at said points of intersection.

12. The assembly of claim 1, wherein said grid is bonded to said cathode side at areas other than said points of intersection.

13. The assembly of claim 1, where said anode side is bonded to cathode side at areas other than said points of intersection.

14. The assembly of claim 1, wherein said grid is made of wire mesh.

15. The assembly of claim 1, wherein said grid is made of foam.

16. The assembly of claim 1, wherein said grid has an insulating coating.

17. The assembly of claim 1, wherein said grid is made of a material having substantially the same CTE as said electrolyte.

18. The assembly of claim 1, wherein said grid is made of ferritic stainless steel.

19. The assembly of claim 1, wherein said grid is made of zirconia foam.

20. The assembly of claim 1, wherein said electrolyte member comprises a plurality of discrete electrolyte elements and wherein said grid defines a plurality of openings between said ribs, said electrolyte elements being positioned in said openings.

* * * * *